United States Patent [19]
van de Rovaart et al.

[11] 3,930,044
[45] Dec. 30, 1975

[54] IN SITU PRODUCTION OF MEAT LIKE FLAVOR IN EXPANDED POROUS FOOD PRODUCT

[75] Inventors: Paul van de Rovaart, Chexbres; Jean-Jacques Wuhrmann, Saint-Legier, both of Switzerland

[73] Assignee: Societe d'Assistance Technique pour Produits Nestlé S.A., Lausanne, Switzerland

[22] Filed: Nov. 20, 1973

[21] Appl. No.: 417,503

[30] Foreign Application Priority Data
Nov. 21, 1972 Switzerland.................... 16909/72

[52] U.S. Cl. .............................................. 426/533
[51] Int. Cl.² .......................................... A23L 1/231
[58] Field of Search ............ 426/65, 364, 346, 808, 426/533

[56] References Cited
UNITED STATES PATENTS

| | | |
|---|---|---|
| 2,934,437 | 4/1960 | Morton et al........................ 426/65 |
| 3,394,015 | 7/1968 | Giacino................................ 426/65 |
| 3,480,442 | 11/1969 | Atkinson........................ 426/808 X |
| 3,753,729 | 8/1973 | Harms et al. .................... 426/808 X |

Primary Examiner—James R. Hoffman
Attorney, Agent, or Firm—Watson Leavenworth Kelton & Taggart

[57] ABSTRACT

A process for preparing an expanded porous food product having a meat-like flavour comprises heating under pressure a mixture comprising (a) a finely divided food material, (b) a sulphur compound such as a sulphur-containing amino-acid, (c) a pentose or hexose, and (d) water, and rapidly releasing the pressure. Snack products are obtained when component (c) contains a substantial amount of carbohydrates, and meat analogues when the mixture has a high protein content.

17 Claims, No Drawings

IN SITU PRODUCTION OF MEAT LIKE FLAVOR IN EXPANDED POROUS FOOD PRODUCT

The present invention is concerned with the preparation of porous expanded food products having a meat-like taste.

Food products with a porous expanded structure, such as crisp snacks or products simulating the texture of meat, are generally prepared from flour or meal of vegetable origin rich in carbohydrates, or from substances rich in protein of plant, animal or microbial origin. This preparation most frequently involves mechanical working of the previously moistened raw material at a temperature above 100°C and under pressure, followed by a sudden reduction in pressure producing rapid vaporisation of the water contained in the product and the formation of a porous expanded structure in its interior. This process is generally carried out by forcing the product, while hot and under pressure, through an extrusion die, resulting in vaporisation of the water at the die orifice and formation of the desired expanded porous structure.

The products prepared in this way, to the extent that it is desired to impart to them the taste of meat, are subsequently given a flavouring treatment. This treatment generally involves incorporating into the expanded porous products suitable flavouring agents, which may be natural or synthetic. This incorporation is most frequently effected by impregnation of the expanded porous products with aqueous solutions of the flavourings. However, impregnation generally needs to be followed by drying of the flavoured product, be it to restore the crisp character of the product or to reduce the moisture content so that the product may be stored for relatively long periods without appreciable changes in its structure and taste.

The present invention is concerned with a process for preparing an expanded porous food product having a meat-like flavour that is particularly simple and in which the desired texture and taste are obtained in a single operation. This process comprises forming a mixture comprising (a) a finely divided food material (b) at least one pentose or hexose, (c) at least one sulphur-containing amino-acid or an amino-acid and a substance containing sulphur, and (d) water, the mixture containing from 18 to 45% by weight of water, heating the mixture to a temperature of at least 150°C under a pressure which is at least equal to the saturated vapour pressure of water at the temperature to which the mixture is heated, and thereafter rapidly reducing the pressure to which the mixture is subjected to vaporise the major proportion of the water contained in the mixture thereby forming an expanded porous structure in its interior.

The expression "finely divided food material" is intended to mean a material in the form of particles of greater or lesser fineness such as a plant flour or semolina rich in carbohydrates, for example maize starch or rice flour or semolina, or of a material rich in protein, for example soya bean flour or a product containing proteins of animal or microbial origin. Protein-containing materials such as soy flour preferably have a low fat content, for example not exceeding about 0.5% by weight.

The pentose or hexose, for convenience refered to as glycose, may be D-ribose, D-xylose, L-arabinose or glucose. Cysteine is the preferred sulphur-containing amino-acid, but as an alternative an amino-acid not containing sulphur, such as alanine, may be used together with a substance containing sulphur, for example hydrogen sulphide or sodium sulphide. A hydrolysed plant protein may advantageously be used as the source of the amino-acids. The respective quantities of these substances may be selected over a very wide range according to the nature of the food product starting material and the characteristics of structure and taste which it is desired to impart to the final product. In general, it is preferable to use a total quantity of glycose (s) and of amino-acid or acids equal to 0.5 to 3% by weight of the dry-matter in the food material, the molar ratio of glycose to amino-acid (glycose/amino-acid) being preferably between 0.5 and 2 to 1, and advantageously at least 1:1. Mixtures of two or more glycoses, and/or amino acids, may also be used. Moreover, flavouring and/or texturing agents such as sodium glutamate, inosine or guanosine monophosphate, lactic acid, calcium chloride or sodium chloride may also be added to the mixture.

The mixture has a water content of between 18 and 45% by weight, as it has been found that with a water content below 18% the amount of steam formed during the course of the rapid drop in pressure is not sufficient to develop an expanded porous structure in the interior of the product, whereas with water contents above 45% the amount of steam generated is excessive causing the final product to have a very irregular and frayed structure. The water content is generally selected having regard to the water absorption capacity of the food material, so that after absorption by the food product, the mixture has a dough-like consistency without a liquid phase.

The mixture is conveniently prepared by moistening the powdered food material with an aqueous solution containing the glycose and the amino-acid. The mixture is then heated under pressure, and during the heating the substances added in solution react to form a meat-like flavour in the interior of the mixture. Tests have demonstrated that under the conditions of temperature, pressure and humidity described above, the reactions producing the meat flavour are unexpectedly completed in a very short time of the order of 10 to 60 seconds. It has also been observed that the formation of an expanded porous structure and the production of a meat flavour are two phenomena which have the same temperature requirements, and heating at a temperature below 150°C does not produce the desired flavour and texture. Moreover, comparative taste-tests made on the expanded porous products prepared in accordance with the invention, and on expanded porous products obtained by conventional extrusion and impregnation with aqueous solutions containing the same precursors in the same concentration, and previously heated under the same conditions of temperature, pressure and time, have shown that the products obtained by the process in accordance with the invention have a flavour of meat that is clearly more pronounced and fuller. These tests are described in detail in the examples.

The mixture is preferably heated at a temperature of between 160° and 180°C under a pressure of the order of 5 to 150 atmospheres. Under these conditions, a heating time of the order of 10 to 30 seconds is sufficient to produce a meat flavour in the interior of the final product.

The process may advantageously be carried out by mechanically working the heated mixture under pressure and then forcing it through an extrusion die of suitable shape into a zone in which the pressure is substantially lower, for example the ambient atmosphere, this pressure drop causing evaporation of the water with the formation of an expanded porous structure in the interior of the product.

If the starting material is a vegetable material rich in carbohydrates, the final product is a crisp snack having a porous expanded structure and a meat-like flavour, and a moisture content of about 3 to 10%.

Starting from a substance rich in protein, or a powdered product containing animal or microbial proteins, the final product has a fibrous structure analogous to the texture of meat and a meat-flavour. Such a product, with a moisture content of about 5 to 10%, may be rehydrated very easily by simple immersion in water. The influence of the type and amount of the additives on the texture of the resulting fibrous product, as well as on the consistency and the cohesion of the rehydrated product, has been demonstrated experimentally. Thus, for example, extrusion of soya bean flour containing cysteine and ribose produces a product which on rehydration is softer than a product obtained by extrusion of the same soya flour under the same conditions but without the addition of cysteine and ribose.

The invention is illustrated by the following examples, in which the percentages are expressed on a weight basis.

EXAMPLE 1

10 kg of defatted soya bean flour containing 9.7% moisture and 53.5% protein (based on dry matter) are mixed with 3250 g of an aqueous solution containing 83.3 g D-ribose, 66.7 g L-cysteine, 100 g sodium chloride and 100 g calcium chloride. The resulting dough, which contains 29.2% water, is introduced into the feed hopper of an extruder. This extruder, of conventional type, comprises a cylindrical barrel provided with three resistance heaters and a screw positioned inside the barrel driven by a motor. At one end of the barrel is a feed hopper and on the other end a conical extrusion die with a circular orifice. The barrel is heated and the screw is rotated. The dough is continuously fed into the barrel from the hopper, where it is worked mechanically and advanced by the screw towards the die, at a temperature of 160°C and under a pressure varying between 20 and 140 atmospheres, depending on its location in the barrel and the compression caused by the screw. Thermocouple and straingauge manometer probes are inserted into the barrel for measuring the temperature and pressure of the dough. After being worked, the dough enters the tapered connecting zone between the barrel and the die, where it is subjected to a pressure of 12 atmospheres, and emerges from the die after a residence time of 30 seconds at 160°C under pressure. At the exit from the die the dough expands with simultaneous evaporation of water, forming a continuous cylinder of fibrous expanded material containing 6.35% water and a flavour analogous to that of roast chicken meat.

By way of comparison, an extruded product is prepared in the same apparatus and under the same conditions of temperature, pressure and processing time, starting from 10 kg of the same soya bean flour moistened with 3100 g of an aqueous solution containing 100 g sodium chloride and 100 g calcium chloride. A fibrous, expanded product of neutral taste and containing 6.2% moisture is obtained. A solution of 83.3 g D-ribose and 66.7 g L-cysteine in 3870 g water is also prepared, the D-ribose and L-cysteine concentrations being the same as the concentration of these substances in the aqueous solution used for preparing the dough described at the beginning of this example. This aqueous solution is heated for 30 seconds at 160°C under pressure in a scraped-surface heat exchanger, and is then used to rehydrate the neutral product obtained by extrusion, in the proportions of 402 g solution to 982 g extruded product and 1616 g water, at 4°C during 15 hours.

1000 g of the textured product obtained by the process described at the beginning of this example are ground and rehydrated with 2000 g of water at 4°C for 15 hours. Three samples each of this product, and of the product rehydrated with the precursor solution heated to 160°C, are submitted to a panel of 8 trained tasters. The tests are of the triangle type, which means that each group (triangle) contains two samples which are alike and a third which is different. For the results to be significant, each taster has to identify the odd sample in each triangle. The tasters were also requested to indicate a preference between the samples in each triangle. All the tasters easily identified the odd sample in each triangle and assessed the flavour of the product obtained in accordance with the invention as being much more pronounced and fuller than that of the reference.

Furthermore, the consistencies of the two products were examined after rehydration under the same conditions in order to determine the effect of the addition of the precursors. The samples compared were the following:

Sample A: The product obtained by extrusion of the mixture of soya bean flour + cysteine + ribose; unground, rehydrated by steeping in boiling water for 20 minutes.

Sample B: The product obtained by extrusion of the same moistened soya bean flour (same water content as the mixture); unground, rehydrated under the same conditions as sample A.

The shear strength of 30 g lots of samples A and B was measured with a Kramer texturemeter (Type TP 2 Shear Press manufactured by the Food Technology Corporation). The results, listed in the table below, show that sample A has a more satisfactory consistency than sample B. The values shown are the arithmetic mean of 10 determinations.

| Samples | Shear strength kg |
|---|---|
| A | 67.5 |
| B | 89.5 |

In addition, comparative tests of the water absorption capacity of Samples A and B demonstrated the superior absorptive power of Sample A. The water absorption capacity was determined by steeping the two samples in water at 100°C and then weighing each sample after 10 and 20 minutes. The results are given in the table below.

| Sample | Weight of water (in g) absorbed by 100 g product | |
|---|---|---|
| | After 10 minutes | After 20 minutes |
| A | 265 | 305 |
| B | 230 | 232 |

EXAMPLE 2

An aqueous solution containing the following substances is prepared:

| | | |
|---|---|---|
| D-Xylose | 8.3 | g |
| L-Cysteine | 5.0 | g |
| β-Alanine | 0.6 | g |
| L-Histidine | 1.07 | g |
| CaCl$_2$ | 10.0 | g |
| NaCl | 10.0 | g |
| Lactic acid | 10.0 | g |
| Sodium glutamate | 5.0 | g |
| Inosine monophosphate | 3.0 | g |
| Water | 314 | g |

This aqueous solution is added to 1000 g of a defatted soya bean flour containing 5.4% mositure to provide a dough having a water content of 26.9%. The dough is then fed into the extruder described in Example 1, worked mechanically at 158°C for 25 seconds and extruded into atmospheric pressure.

An expanded, fibrous material is obtained, containing 6.3% moisture and which, after rehydration by immersion in water at 100°C for 20 minutes provides a product having the flavour of boiled beef and a meat-like texture. The consistency of this product is firmer than that of the product obtained in Example 1 (Shear strength measured with the Kramer texturemeter = 99.6 kg).

EXAMPLE 3

A solution of 7.5 g ribose and 7.5 g cysteine in 119 g of water is prepared.

This solution is added to 1000 g of maize starch flour containing 11.6% moisture, to provide a dough having a water content of 20.7%. The dough is fed into the extruder described in Example 1, worked mechanically at 180°C for 15 seconds and extruded atmospheric pressure.

A crisp, expanded porous product containing 7.3% moisture is obtained. Its flavour is similar to that of roast beef.

For comparison purposes, 1000 g of the same maize starch flour are moistened with 119 g water and extruded as described previously. A similar product is obtained, but with a neutral taste.

A solution of 7.5 g ribose and 7.5 g cysteine in 235 g of water is prepared and heated for 15 seconds under pressure at 180°C in a scraped-surface heat exchanger. The porous expanded product obtained by extrusion of the dough is ground and impregnated with this aqueous solution in the proportion of 25.8 g of solution to 98.3 g of the ground product and 175.8 g water. This moist product is designated B.

The extruded product (100 g) obtained from the mixture of maize starch and ribose-cysteine solution is also ground and moistened with 200 g of water. This moist product is designated A.

Although products A and B have lost the desired crisp character, it is appropriate to compare their flavour properties under equivalent conditions of moisture and concentration. Thus, samples of product A and B were submitted to a panel of eight trained tasters, in triangle tests as described in Example 1. All the tasters identified the odd sample in each triangle and judged the meat flavour in samples A to be more pronounced and fuller than in samples B.

It should also be noted that when a crisp product is desired, the flavouring of a product extruded without a precursor with an aqueous flavouring solution implies incomplete impregnation because the material is not ground, and also requires a subsequent drying operation. By contrast, the process of the invention provides directly a crisp product having a superior flavour of meat.

EXAMPLE 4

An aqueous solution having the composition given in Example 2 is prepared, except that the xylose is replaced by 9.96 g of glucose.

This solution is added to 1000 g of a defatted soya bean flour containing 5.4% moisture, providing a dough containing 26.89% water.

The dough is then extruded as described in Example 2, and, after rehydration under the same conditions, yields a product with a meat-like texture and the flavour of boiled beef, although slightly less pronounced than that of the product obtained in Example 2.

EXAMPLE 5

An aqueous solution containing the following substances is prepared:

| | | |
|---|---|---|
| D-Xylose | 4.52 | g |
| β-Alanine | 0.704 | g |
| L-Histidine | 1.166 | g |
| NaSH, H$_2$O | 1.58 | g |
| CaCl$_2$ | 5.0 | g |
| NaCl | 5.0 | g |
| Sodium glutamate | 2.5 | g |
| Inosine monophosphate | 1.5 | g |
| Water | 143 | g |

This solution is added to 500 g of a defatted soya bean flour containing 7.4% moisture, giving a dough containing 27.1% of water. The dough is fed into the extruder described in Example 1, worked mechanically at 160°C for 25 seconds and extruded at atmospheric pressure.

An expanded fibrous product is obtained, brown in colour, and which on rehydration provides a material having a meat-like texture and a boiled beef taste slightly less pronounced than that of the product obtained in Example 2.

We claim:

1. A process for preparing an expanded porous food product having a meat-like flavour, which comprises forming a mixture comprising
   a. a finely divided carbohydrate or protein food material,
   b. at least one pentose or hexose,
   c. at least one sulfur-containing amino acid or an amino acid and a substance containing sulfide, and
   d. water, the mixture containing from 18 to 45% by weight of water, heating the mixture to a temperature of at least 150°C under a pressure which is at least equal to the saturated vapor pressure of water at the temperature to which the mixture is heated, whereby said constituents (b) and (c) react to impart a meat-like flavour, and thereafter rapidly reducing the pressure to which the mixture is subjected to vaporize the major proportion of the water contained in the mixture thereby forming an expanded porous structure in its interior.

2. A process according to claim 1, in which the total weight of components (b) and (c) represents between 0.5 and 3% of the weight of component (a).

3. A process according to claim 2, in which the quantities of components (b) and (c) are in a ratio of at least 1:1.

4. A process according to claim 3, in which component (a) is soya bean flour.

5. A process according to claim 3, in which component (c) is cysteine.

6. A process according to claim 1, in which the respective quantities of component (b) and component (c) present in the mixture are in a molar ratio between 0.5 and 2 to 1.

7. A process according to claim 1, in which component (a) contains at least 30% by weight of protein.

8. A process according to claim 1, in which component (a) is maize starch or rice flour.

9. A process according to claim 1, in which component (c) is cysteine.

10. A process according to claim 1, in which component (a) is semolina.

11. A process according to claim 1, in which component (a) is a protein material of animal or microbial origin.

12. A process according to claim 1, in which component (c) comprises amino acid which does not contain sulfur and hydrogen sulfide or sodium sulfide.

13. A process according to claim 1, in which component (c) comprises hydrolysed plant protein and hydrogen sulfide or sodium sulfide.

14. A process according to claim 1, in which the mixture, prior to heating, is of dough-like consistency and exhibits no liquid phase.

15. A process according to claim 14, in which the mixture is heated for from about 10 to about 60 seconds prior to reduction of pressure and vaporization of the major proportion of the water contained therein.

16. A process according to claim 15, in which the total weights of components (b) and (c) represents between 0.5 and 3% of the weight of component (a) and the respective quantities of components (b) and (c) present in the mixture are at a mole ratio of between 0.5 and 2 to 1.

17. A process according to claim 16, in which the mixture is heated to a temperature of 160° to 180°C at a pressure of 5 to 150 atmospheres for a period of time of from 10 to 30 seconds.

* * * * *